2,947,789
1,1-BIS(HYDROXY-3-ALKYL-6-ISOPROPYL-PHENYL) ALKANES

Joseph C. Ambelang, Akron, Ohio, assignor to The Firestone Tire & Rubber Company, Akron, Ohio, a corporation of Ohio No Drawing. Filed Dec. 20, 1957, Ser. No. 704,000

8 Claims. (Cl. 260—619)

This invention relates to a novel class of substituted bisphenol alkanes useful as non-blooming, non-staining anti-oxidants for vulcanizable natural and synthetic rubbers. The new compounds also possess antiseptic properties and are useful in detergent soap compositions.

It has previously been proposed to utilize as rubber antioxidants the condensation products of mono- and di-substituted m-cresol, since these condensation products are substantially non-discoloring when utilized in light colored rubber compositions. While it is true that certain of these products have been a great improvement over the prior phenolic rubber antioxidants in the degree of protection afforded the rubber, they suffer a disadvantage when utilized in black or dark colored rubber goods. For example, in the conventional black tire tread composition it has been found that these derivatives of m-cresol, when used in the ordinary concentration of approximately 1% on the rubber, quickly bloom to the surface of the vulcanized rubber product causing it to assume an unsightly appearance. Such blooming is extremely objectionable from a commercial standpoint, since it renders the rubber products practically unsaleable.

It is an object of the present invention to produce a new class of non-staining rubber antioxidants, which are useful for the protection of rubber compositions from deterioration.

It is also an object to provide an improved class of non-staining antioxidants which do not tend to bloom from rubber compositions containing them while present therein to the extent desirable for full protection of the rubber composition. Suitable methods of preparing the new antioxidants are provided.

Other objects will be apparent in the description of the invention which follows.

The compounds of the invention belong to the class of 1,1-bis(3-polyalkylcarbinyl-2 and 4- hydroxy-6- isopropyl-phenyl) alkanes of the following formulas:

In each of Formulas A, B and C, $R_1$ and $R_4$ are hydrogen or alkyl radicals, and $R_2$ and $R_3$ are alkyl radicals. When $R_4$ is alkyl, it can contain one to eight, inclusive, carbon atoms. $R_1$, $R_2$ and $R_3$ contain a total of two through nine carbon atoms. Examples of polyalkylcarbinyl groups are isopropyl, tert-butyl, sec-butyl, tert-amyl, 2-pentyl, 3-pentyl, methylisopropylcarbinyl, ethylpropylcarbinyl, dimethylpropylcarbinyl, triethylcarbinyl, tri-n-propylcarbinyl, dimethyl-n-butylcarbinyl, dimethyl-n-hexylcarbinyl, dimethyl-n-octylcarbinyl and other known secondary and tertiary alkyl radicals containing three to ten, inclusive, carbon atoms.

The new antioxidants can be prepared by reacting substantially one mole of an aliphatic aldehyde with 2 moles of the appropriate substituted m-isopropylphenol. The aldehydes which are used in preparing the new compounds are formaldehyde, acetaldehyde, crotonaldehyde, butyraldehyde, isobutyraldehyde, aldol, acrolein, propionaldehyde, valeraldehyde, isovaleraldehyde, 2-ethylbutyraldehyde, hexanal, heptanal, 2-ethylhexanal, 3,5,5-trimethylhexanal and similar low molecular weight aliphatic aldehydes. The condensation reaction is preferably accelerated by the use of an acid catalyst. It is important, however, to avoid using any substantial excess of the aldehyde over the proportion thereof set out above, in order to produce the non-resinous relatively low molecular weight compounds of the invention and to avoid producing high molecular weight resinous condensates, as the latter are relatively poor antioxidants.

The following examples are illustrative of the preparation of the compounds of the invention.

EXAMPLE 1

*Bis(3-tert-butyl-2 and 4-hydroxy-6-isopropylphenyl)-methane*

A solution was prepared by dissolving 68 grams (0.50 mole) of m-isopropylphenol in 50 ml. of n-hexane, and 4 grams of stannic chloride was added as a catalyst. The solution containing the catalyst was stirred at 40–50° C. for 2.5 hours during the gradual addition of 50 grams (0.54 mole) of tert-butyl chloride. The mixture was refluxed for 2 hours and then allowed to stand overnight at room temperature. The liquid reaction mixture was washed with dilute hydrochloric acid, then with water, then with 2% sodium hydroxide solution, and finally dried over sodium sulfate. The dried solution was filtered, and the filtrate was chilled to cause the reaction product to crystallize. The collected crystalline product weighed 51 grams and melted at 49–50° C. The analytical results are as follows:

|  | Calculated for $C_{13}H_{20}O$ | Found |
| --- | --- | --- |
| Percent Carbon | 81.24 | 81.22 |
| Percent Hydrogen | 10.41 | 10.54 |
| Molecular Weight | 192 | 191 |

A mixture of 9.6 grams (0.05 mole) of 2-tert-butyl-5-isopropylphenol, produced as described above, 2.1 grams (0.025 mole) of formaldehyde as formalin, 20 ml. of glacial acetic acid and 3.4 ml. of concentrated hydrochloric acid was allowed to stand at room temperature for 24 hours. The resulting mixture was diluted with an equal volume of water, and extracted with a mixture of petroleum ether and ether. The ether extract was washed with water, dried over anhydrous sodium sulfate, and filtered. The reaction product was separated from the filtrate as a few grams each of yellow crystals melting at 153–157° C. (molecular weight 364) and an amber syrup (molecular weight 308). Because of the high melting point of the crystalline product and the additional fact that the infrared absorption curve of the substance indicated the essential absence of intramolecular hydrogen bonding, it was determined that the crystalline product was bis(3 - tert - butyl - 4 - hydroxy - 6 - isopropylphenyl)-methane, having the following structure in accordance with Formula B:

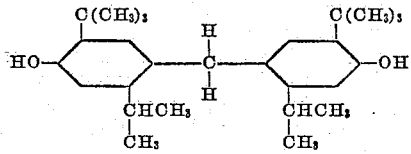

The infrared absorption curve for the syrupy product showed substantial intramolecular hydrogen bonding and also the substantial presence of disassociated hydroxyl groups when the product was measured in dilute solution. Hence the liquid reaction product contained a substantial proportion of bis(3-tert-butyl-2-hydroxy-6-isopropylphenyl)methane, having the following structure in accordance with Formula A:

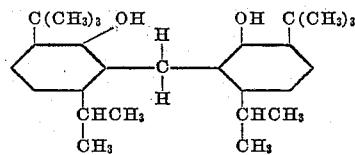

together with a substantial proportion of bis(3-tert-butyl-4 - hydroxy - 6 - isopropylphenyl)methane of Formula B and/or the substance in accordance with Formula C having the following structure:

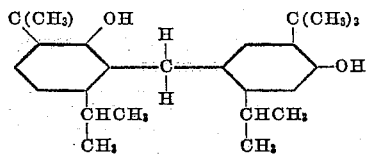

EXAMPLE 2

*1,1-bis(3-tert-butyl-2 and 4-hydroxy-6-isopropylphenyl)n-butane*

A mixture of 9.6 grams (0.05 mole) of 2-tert-butyl-5-isopropylphenol, produced as described above, 1.8 grams (0.025 mole) of n-butyraldehyde, 20 ml. of glacial acetic acid and 3.4 ml. of concentrated hydrochloric acid was allowed to stand at room temperature for 24 hours. The resulting mixture was diluted with an equal volume of water, and extracted with a mixture of petroleum ether and ether. The ether extract was washed with water, dried over anhydrous magnesium sulfate, and filtered. The reaction product obtained from the filtrate was a thick red-brown syrup containing a few crystals, and containing a substantial proportion of 1,1-bis(3-tert-butyl-4-hydroxy-6-isopropylphenyl)n-butane, having the following formula in accordance with Formula B:

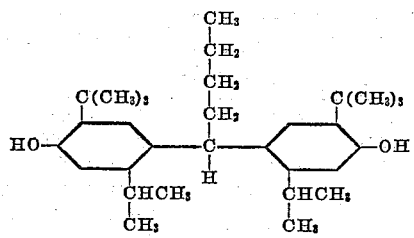

The product also contained 1,1-bis(3-tert-butyl-2-hydroxy-6-isopropylphenyl)n-butane, having the following structure in accordance with Formula A:

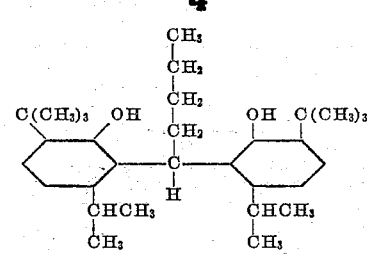

EXAMPLE 3

*1,1-bis(3-tert-butyl-2 and 4-hydroxy-6-isopropylphenyl)-n-hexane*

A mixture of 9.6 grams (0.05 mole) of 2-tert-butyl-5-isopropylphenol, produced as described in Example 1, 2.5 grams (0.025 mole) of n-hexaldehyde, 20 ml. of glacial acetic acid and 3.4 ml. of concentrated hydrochloric acid was allowed to stand 24 hours at room temperature. The resulting mixture was diluted with an equal volume of water, and extracted with a mixture of petroleum ether and ether. The ether extract was worked up as in previous examples to yield a few grams of very dark red syrup, containing a substantial proportion of 1,1 - bis(3 - tert - butyl - 4 - hydroxy - 6-isopropylphenyl)-n-hexane, having the following structure in accordance with Formula B:

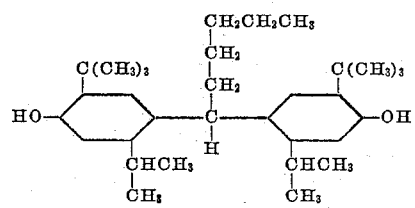

The syrupy product also contained 1,1-bis(3-tert-butyl-2-hydroxy-6-isopropylphenyl)n-hexane, having the following structure in accordance with Formula A:

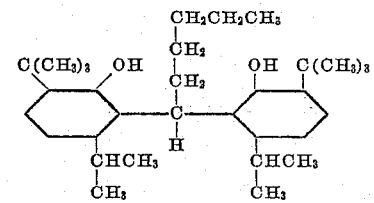

EXAMPLE 4

*Bis(3-tt-octyl-2 and 4-hydroxy-6-isopropylphenyl)-methane*

Into a 500 ml. 3-neck flask provided with a stirrer, a dropping funnel and a thermometer were placed 68 grams (0.50 mole) of m-isopropylphenol and 5 grams of stannic chloride. To this mixture 84 grams (0.75 mole) of diisobutylene was slowly added with stirring. The temperature of the mixture slowly rose from 24° to 45° C. After addition of the diisobutylene the dropping funnel was replaced with a reflux condenser, and the reaction mixture was heated for 2 hours at 75° C. Then the mixture was cooled, washed with dilute hydrochloric acid, then water, 5% sodium hydroxide and finally water. The product was dried over anhydrous sodium sulfate. The crude product was vacuum-distilled to yield 69 grams of a colorless, viscous liquid boiling at 100–102° C. at 2 mm. The liquid product analyzed as follows:

|  | Calculated for $C_{17}H_{28}O$ | Found |
|---|---|---|
| Percent Carbon | 82.3 | 82.1 |
| Percent Hydrogen | 11.2 | 11.3 |
| Molecular weight | 248 | 245 |

A mixture of 12.3 grams (0.05 mole) of 2-tt-octyl-5-isopropylphenol, produced as described above, 2.5 grams (0.03 mole) of formaldehyde as formalin, 3.4 ml. of concentrated hydrochloric acid and 30 ml. of glacial acetic acid was allowed to stand at room temperature for 24 hours. The resulting mixture was diluted with an equal volume of water, and extracted with a mixture of petroleum ether and ether. The ether extract was washed with water, dried over anhydrous magnesium sulfate, and filtered. The reaction product obtained from the filtrate was a thick syrup, containing a substantial proportion of bis(3-tt-octyl-4-hydroxy-6-isopropylphenyl)methane, having the following structure in accordance with Formula B:

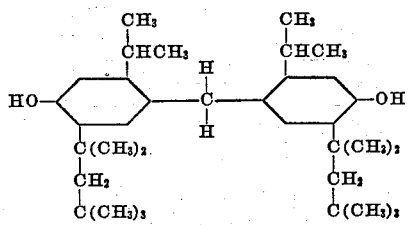

The syrupy product also contained bis(3-tt-octyl-2-hydroxy-6-isopropylphenyl)methane, having the following structure in accordance with Formula A:

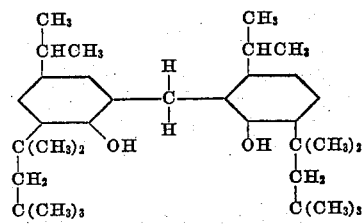

TEST I

The compounds of the invention, prepared as indicated above, were tested as antioxidants in comparison with a conventional staining antioxidant in the following pneumatic tire tread formula:

Ingredients: Parts by weight
- Rubber _____ 100
- Softener _____ 4
- Stearic acid _____ 3
- Zinc oxide _____ 3
- Thiazole accelerator _____ 1
- Sulfur _____ 3
- Carbon black (EPC) _____ 50
- Antioxidant _____ 1

The control stock contained the conventional staining antioxidant, 6-phenyl-2,2,4-trimethyl-1,2-dihydroquinoline, and the antioxidants of the invention were included in the two other analogous stocks, as shown in Table 1, which also contains testing data on the three rubber compositions.

TABLE 1

| Antioxidant | Test Stock | | |
|---|---|---|---|
| 6-phenyl-2,2,4-trimethyl-1,2-dihydroquinoline | A | | |
| Bis(3-tert-butyl-4-hydroxy-6-isopropylphenyl)methane | | B | |
| Bis(3-tert-butyl-2 and 4-hydroxy-6-isopropylphenyl)methane | | | C |
| Cure 60 minutes at 280° F.: | | | |
| Normal Tensile Properties: | | | |
| Modulus at 400% elongation (p.s.i.) | 2,750 | 2,725 | 2,750 |
| Tensile strength (p.s.i.) | 3,800 | 3,700 | 3,550 |
| Elongation at break (1%) | 490 | 480 | 460 |
| Aged 2 Days at 212° F. in Air: | | | |
| Modulus at 400% | | | |
| Tensile strength | 1,800 | 2,000 | 1,775 |
| Elongation at break | 270 | 270 | 260 |
| Percent Retention of tensile strength | 47.5 | 54.0 | 50.0 |

It will be seen from Table 1 that the two antioxidants of the invention were superior in protecting tire tread rubber from deterioration in comparison with the well thought of dihydroquinoline antioxidant.

TEST II

The two antioxidants of the invention utilized in Test I were compared in a typical black sidewall tire stock with analogous condensation products of butyl m-cresol. The black sidewall tire stock formula is the following:

Ingredients: Parts by weight
- Rubber _____ 100
- Carbon black (EPC) _____ 25
- Zinc oxide _____ 3
- Pine tar _____ 3
- Sulfur _____ 2
- Stearic acid _____ 2
- Thiazole accelerator _____ 1.05
- Antioxidant _____ 1

Comparisons of the control stock "D" containing no antioxidant with the stocks containing the antioxidants of the invention and stocks containing the m-cresol derivatives are given in the following Table 2.

TABLE 2

| | Test Stock | | | | |
|---|---|---|---|---|---|
| Control (no antioxidant) | D | | | | |
| Bis(3-tert-butyl-4-hydroxy-6-isopropylphenyl)methane | | E | | | |
| 1,1-bis(3-tert-butyl-2 and 4-hydroxy-6-isopropylphenyl)n-butane | | | F | | |
| 2-tert-butyl-5-methylphenol-formaldehyde condensate | | | | G | |
| 2-tert-butyl-5-methylphenol-butyraldehyde condensate | | | | | H |
| Cure 60 minutes at 280° F.: | | | | | |
| Aged 7 days—bloom observed | none | none | none | crystalline bloom. | crystalline bloom. |
| Aged 31 days—bloom observed upon scraping surface | none | none | none | moderately heavy white. | moderately heavy white. |

Table 2 clearly shows that the antioxidants of the present invention do not bloom, whereas the aldehyde condensation products of m-cresol bloom badly.

TEST III

An antioxidant of the present invention was compared with another derivative of m-cresol in a white sidewall tire stock of the following formula:

Ingredients: Parts by weight
- Pale crepe rubber _____ 100
- White pigments _____ 85
- Ultramarine blue _____ 0.2
- Zinc oxide _____ 5
- Stearic acid _____ 1.2
- Sulfur _____ 3
- Accelerator _____ 0.9
- Wax _____ 2
- Antioxidant _____ 1

Stocks containing the two test antioxidants were mixed in the usual manner and cured 60 minutes at 280° F., with results all as shown in the following Table 3:

TABLE 3

| Antioxidant | Test Stock | |
|---|---|---|
| Bis(3-tert-butyl-4-hydroxy-6-isopropylphenyl)-methane | J | |
| 2-tert-butyl-5-methylphenol-acetaldehyde condensate | | K |
| Cure 60 minutes at 280° F. | | |
| Normal Tensile Properties: | | |
| Modulus at 400% | 950 | 875 |
| Tensile strength | 3,700 | 3,550 |
| Elongation at break | 640 | 630 |
| Aged 2 Days at 212° F. in Air: | | |
| Modulus at 400% | 1,075 | 1,000 |
| Tensile strength | 2,550 | 2,350 |
| Elongation at break | 540 | 530 |
| Percent retention of tensile strength | 69 | 66 |

It is evident from Table 3 that the antioxidant of the invention is superior to the m-cresol derivative in imparting higher physical properties to a white sidewall tire stock and in retaining more strength after aging.

Other antioxidant tests in both white and black sidewall stocks have shown the following additional examples of the invention to be good non-discoloring, non-blooming antioxidants:

Example 1.—Syrupy product comprising a substantial proportion of bis(3-tert-butyl-2-hydroxy-6-isopropylphenyl)methane Example 3.—1,1-bis(3-tert-butyl-2 and 4-hydroxy-6-isopropylphenyl)n-hexane Example 4.—bis(3-tt-octyl-2 and 4-hydroxy-6-isopropylphenyl)methane This application is a continuation-in-part of application Serial No. 375,805, filed August 21, 1953, now abandoned.

What is claimed is:

1. A 1,1-bis(3-polyalkylcarbinyl-6-isopropyl-hydroxyphenyl)alkane of the group of compounds of the following structures:

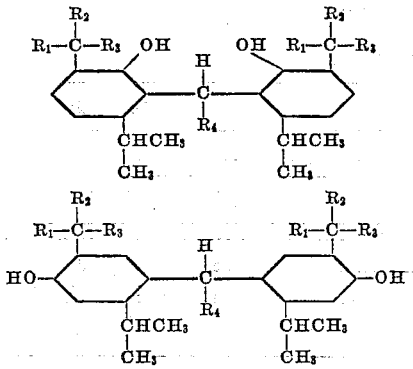

in which $R_1$ and $R_2$ are methyl radicals, $R_3$ is of the group consisting of methyl and neopentyl radicals and $R_4$ is of the group consisting of hydrogen and alkyl radicals containing one to five, inclusive, carbon atoms.

2. A compound having the structure

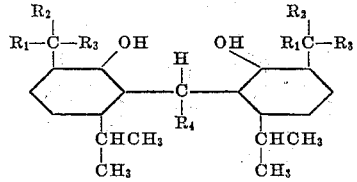

in which $R_1$ and $R_2$ are methyl radicals, $R_3$ is of the group consisting of methyl and neopentyl radicals and $R_4$ is of the group consisting of hydrogen and alkyl radicals containing one to five, inclusive, carbon atoms.

3. A compound having the structure

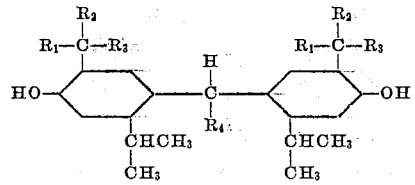

in which $R_1$ and $R_2$ are methyl radicals, $R_3$ is of the group consisting of methyl and neopentyl radicals and $R_4$ is of the group consisting of hydrogen and alkyl radicals containing one to five, inclusive, carbon atoms.

4. 1,1-bis(3-tert-butyl-4-hydroxy-6-isopropylphenyl)-n-butane.

5. 1,1-bis(3-tert-butyl-4-hydroxy-6-isopropylphenyl)-n-hexane.

6. Bis(3-tt-octyl-4-hydroxy-6-isopropylphenyl)-methane.

7. Bis(3-tert-butyl-2-hydroxy-6-isopropylphenyl)-methane.

8. Bis(3-tert-butyl-4-hydroxy-6-isopropylphenyl)-methane.

References Cited in the file of this patent
UNITED STATES PATENTS
2,647,102    Ambelang _____ July 28, 1958

UNITED STATES PATENT OFFICE
CERTIFICATE OF CORRECTION

Patent No. 2,947,789            August 2, 1960

Joseph C. Ambelang

It is hereby certified that error appears in the above numbered patent requiring correction and that the said Letters Patent should read as corrected below.

Column 6, TABLE 1, under the heading, "Antioxidant", line 11 thereof, for "Elongation at beak (1%)----" read -- Elongation at break (%) --.

Signed and sealed this 1st day of May 1962.

(SEAL)
Attest:

ERNEST W. SWIDER
Attesting Officer

DAVID L. LADD
Commissioner of Patents